No. 736,100. PATENTED AUG. 11, 1903.
N. HOSTETTLER.
LOCATOR FOR USE IN PLANT SETTING.
APPLICATION FILED DEC. 22, 1902.
NO MODEL.
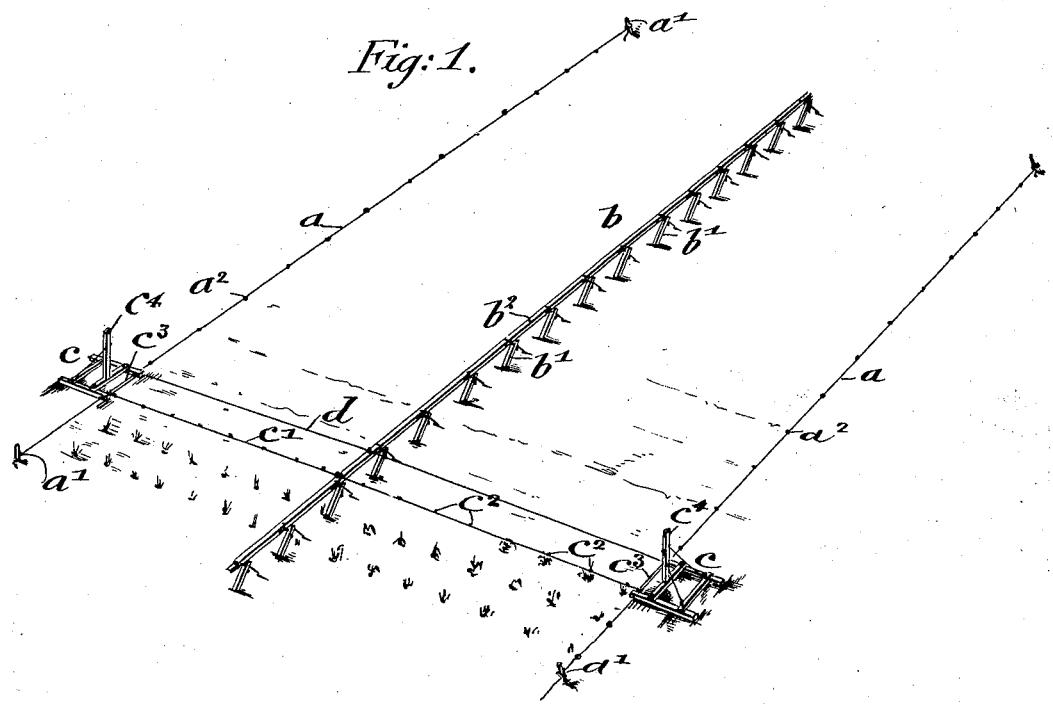
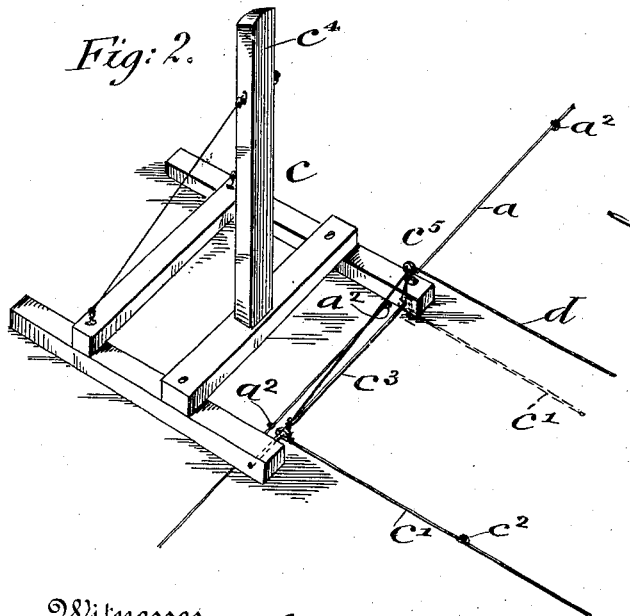
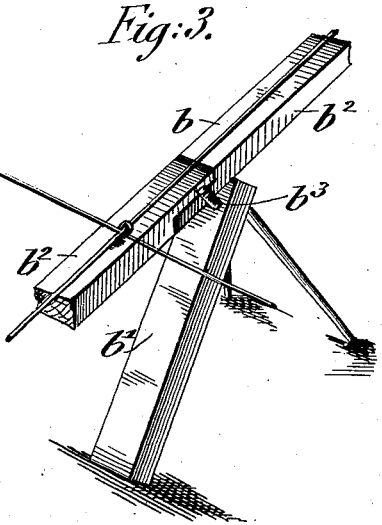

No. 736,100. Patented August 11, 1903.

UNITED STATES PATENT OFFICE.

NICHOLAS HOSTETTLER, OF EUGENE, OREGON.

LOCATOR FOR USE IN PLANT-SETTING.

SPECIFICATION forming part of Letters Patent No. 736,100, dated August 11, 1903.

Application filed December 22, 1902. Serial No. 136,108. (No model.)

*To all whom it may concern:*

Be it known that I, NICHOLAS HOSTETTLER, a citizen of the United States, residing at Eugene, in the county of Lane and State of Oregon, have invented certain new and useful Improvements in Locators for Use in Plant-Setting, of which the following is a specification.

This invention relates to a device for indicating where plants are to be set, and more especially relates to a system of planting adapted for gardening or trucking purposes by which the operation of setting out plants in a regular and even manner is facilitated. Its object is to provide a simple and efficient means whereby the plants can be set out in regularly-spaced rows and at even distances apart in the rows.

To accomplish this end the invention consists of a device for indicating where plants are to be set, comprising two parallel graduated lines stretched longitudinally at opposite sides of the field to be planted and along which anchor-frames are adapted to be placed in the operation of planting, a laterally-shiftable guiding-line attached to said anchor-frames and extending transversely of the field, and an operating cable or rope connected with the guide-line for shifting the same, as will be more fully described hereinafter, and finally pointed out in the claims.

In the accompanying drawings, Figure 1 is a birds-eye view of a field with my planting device set up. Fig. 2 is a perspective view of one of the anchor-frames thereof, and Fig. 3 is a perspective view of a portion of the guide-rail extending centrally of the field.

Similar letters of reference indicate corresponding parts.

Referring to the drawings, $a$ represents two graduated lines stretched longitudinally of the field to be planted, at opposite sides thereof, and secured at their ends to stakes $a'$. These lines $a$ are divided or graduated into regular spaces by being provided with knots $a^2$ or any suitable devices, which are spaced to correspond to the distance desired between the rows of plants. Centrally between the lines $a$ and coextensive with the same is a guide-rail $b$, which consists of a plurality of horses $b'$ arranged at short intervals and upon which are supported pieces $b^2$. The pieces $b^2$ are arranged endwise, with adjacent ends halved, so as to afford a flush upper surface throughout the length of the rail $b$, and the ends of the pieces are secured in place between pins $b^3$, arranged in the horses $b'$, as shown in Fig. 3.

Anchor-frames $c$ are placed at each line $a$ and are adapted to be moved along the same from time to time as the planting proceeds. Between the anchor-frames $c$ and connected therewith is a transverse guide-line $c'$, knotted at intervals or otherwise suitably graduated according to the distance desired between the plants in the rows. The ends of the guide-line $c'$ are slidably connected with slide-rods $c^3$ at the front portion of the anchor-frames, as shown in Fig. 2.

Along the guide-line $c'$ extends an operating cord or rope reaching across the field, and the ends thereof pass through eyes $c^5$ on the anchor-frames to connect with the sliding ends of the guide-line $c'$, so as to be capable of shifting the latter from the position shown at the front to the position shown in dotted lines, Fig. 2. The guide-line occupies these two positions at each resetting of the anchor-frames, and thus two rows of plants can be set out without necessitating the resetting of said frames. The operating-cord and the guiding-cord are supported at a medial point upon the rail $b$ and slide over the same as the anchor-frames are moved or the guide-line is shifted by the operating-cord.

In case the distance from one anchor-frame and the rail $b$ be so great as to fail to properly support the guide-line and operating-cord to permit the ready shifting thereof intermediate rails may be interposed to accomplish this end. When the field to be planted has been previously tilled and prepared for planting, the graduated lines $a$ are staked out on the long side of the field, the rail $b$ set up centrally between them, and the anchor-frames $c$ are placed at one end of the field and so arranged that the guide-line $c'$ will be over the first graduations of the lines $a$, and then the device is in position for the planting to begin. The plants are set out along the guide-line at intervals equal to the graduations $c^2$. After the first row has been set out, in order to shift the guide-line to the next graduations of the lines $a$ the operating-cord is pulled, so that both ends thereof will act upon the guide-line and shift it upon the rods $c^3$ and over the rail $b$ at its center. The rods $c^3$ are just long enough to permit the guide-rod to shift a distance corresponding to the spaces between the graduations of the graduated lines $a$. After the second row has been planted the anchor-frames are moved to the position shown in Fig. 1 in such relation to the third and fourth graduations of the lines $a$ that the guide-line will be in position to plant the third row and when shifted to plant the fourth row. The anchor-frames are thus reset again and again as the planting of the rows proceeds, and the central rail facilitates the sliding of the guide-line and operating-cord by supporting the same from dragging on the ground.

The anchor-frames are provided with posts $c^4$, which may be used as sight-posts for facilitating the preliminary staking out and stretching of the graduated lines $a$.

Having thus described my invention, I claim as new and desire to secure by Letters Patent—

1. A locator for use in plant-setting, consisting of parallel graduated lines staked along opposite sides longitudinally of the field, a laterally-shiftable guide-line extending transversely of the field, an operating-cord for shifting said guide-line, and a central supporting-rail for said cord and line, substantially as set forth.

2. A locator for use in plant-setting, consisting of parallel graduated lines staked at opposite sides longitudinally of the field, movable anchor-frames arranged adjacent said graduated lines, a guide-line extending transversely of the field and shiftably connected at its ends with said anchor-frames, an operating-cord connected with the ends of said guide-line for shifting the latter, and a central supporting-rail for medially supporting said operating-cord and guide-line, substantially as set forth.

3. A locator for use in plant-setting, consisting of parallel lines staked at opposite sides longitudinally of the field and having graduations equal to the row-spaces, movable anchor-frames arranged at said lines and adapted to be adjusted relatively to the graduations, transverse rods at the front portion of said frames, a guiding-line loosely connected at its ends with said transverse rods and adapted to be shifted laterally on the same, an operating-cord extending alongside of said guide-line and connected at its ends to the latter, means on said anchor-frames for permitting the lateral shifting of said guide-line by the operating-cord, and a centrally-arranged supporting-rail extending longitudinally of the field, the same consisting of a plurality of horses supporting a plurality of disconnecting-pieces, substantially as set forth.

In testimony that I claim the foregoing as my invention I have signed my name in presence of two subscribing witnesses.

NICHOLAS HOSTETTLER.

Witnesses:
J. M. HOWE,
G. A. SACHZ.